Nov. 19, 1968  A. W. RYTINA ET AL  3,411,781
POLYESTER BOWLING BALL AND METHOD OF MAKING SAME
Filed April 27, 1965
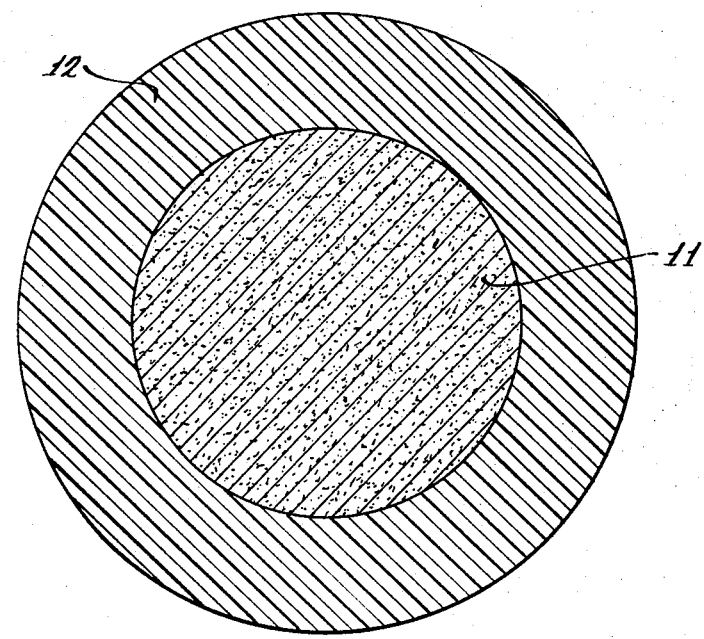
INVENTORS:
Anton W. Rytina
Carl O. Degner
By Hofgren, Wegner,
Allen, Stellman & McCord
Attys

United States Patent Office 3,411,781
Patented Nov. 19, 1968

3,411,781
POLYESTER BOWLING BALL AND METHOD
OF MAKING SAME
Anton W. Rytina, Grand Haven, and Carl O. Degner, Muskegon, Mich., assignors to Brunswick Corporation, a corporation of Delaware
Filed Apr. 27, 1965, Ser. No. 451,250
2 Claims. (Cl. 273—63)

ABSTRACT OF THE DISCLOSURE

A bowling ball having improved hardness, rebound ability, impact resistance, abrasion and scratch resistance, among other desired properties. The ball includes a core and has a polyester cover in which the polyester is cross-linked by polymerization of a monomeric ester of a polyol and unsaturated acid. The polyester is usually a blend of rigid and flexible polyester resins in which the polyesters are dissolved in a suitable monomeric solvent such as styrene. The ball is prepared by mixing the cross-linking monomer into a blend of the liquid rigid and flexible polyester resins, molding the resulting liquid mixture about the ball core and curing the mixture.

---

This invention relates to polyester bowling balls intended for use in bowling games such as the game of Ten Pins and having certain improved characteristics.

In recent years, plastic materials have come more and more into use for high impact and other applications requiring improved properties. For example, in the manufacture of bowling balls, polyesters are often used in lieu of vulcanized rubber or the like for bowling ball covers. However, the polyester must be capable of withstanding the high impact conditions attentive to the game of bowling. It is further desirable to impart to the polyester such properties as high tensile strength, low elongation, and abrasion and scratch resistance, as well as good hardness characteristics. In addition, it is desirable that the polyester covers have good rebound characteristics.

The use of polyester covers on bowling balls in recent years is indicative that polyesters capable of performing the desired function have previously been developed. However, it is important to continually improve on such polyester materials, especially with respect to impact strength, high impact strength giving longer life in the absence of a failure elsewhere. Additionally, the polyester cover materials are generally fairly expensive and improvement of their properties may permit the use of lesser amounts of the polyester or may permit the use of other polyesters which may not, in the absence of such improvement of their properties, have had sufficient advantageous properties in some areas to produce an acceptable bowling ball cover, even though some properties of such other polyesters may be highly desirable.

It is a general object of this invention to provide new and useful polyester articles, such as polyester covered bowling balls.

Another object of this invention is to provide improvements in polyester materials for use as cover stocks in the production of plastic bowling balls.

A further object is to provide a high tensile strength material for use as a cover in a plastic bowling ball, which material is highly resistant to impact and elongation and which also has good scratch and abrasion resistance properties, as well as good surface hardness and rebound characteristics.

Another object of this invention is to improve the physical properties of polyesters derived from polyester resin mixes of a type which heretofore may not have had sufficient advantageous properties for use under high impact conditions.

Other objects of this invention will be apparent to those in the art from the following description and the drawings in which the figure is a section through an embodiment of a bowling ball in accordance with the present invention.

While this invention is susceptible of embodiment in many different forms, there is shown in the drawings and will be described herein in detail a specific embodiment with the understanding that the present disclosure be considered as an exemplification of the principles of the present invention and is not intended to be a limitation thereon.

Turning now to the figure of the drawings, there is illustrated a high impact strength plastic-covered article in the form of a bowling ball having a hard core 11 and a cover 12. The core 11 is shown as a lamination of wood blocks but it is to be understood that the core may be of any such hard material. A large variety of materials has already been found useful in bowling ball cores including wood, sawdust with a resin binder, cork with a resin binder, scrap cover material or other scrap material bonded with an adhesive resin, etc.

The illustrated bowling ball, comprising core 11 and cover 12, may be formed by conventional procedures of bowling ball manufacture. For example, the core is first formed by laminating, molding, shaping or the like. The core and cover materials are selected with respect to the desired ball weight. The core is suspended centrally in a mold and a thermosetting cover resin is poured around the core in the mold. The material in the mold is then subjected to heat and/or pressure as needed for the particular cover resin to set and cure the cover on the core. Curing temperatures may range from 200° F. or lower to 225° F. or higher, depending on the cover resin mixed composition but the temperatures are more usually in the range of 210° F. to 215° F. Sufficient curing pressure is usually present merely by confining the resin against its normal tendency to expand when setting within the mold. The ball is then removed from the mold and finished by shaping, if desired or needed.

The present invention deals especially with the composition of the bowling ball cover or other article. The resin mix for forming the bowling ball cover in accordance herewith is a thermosetting polyester resin mix in which there is incorporated a polyfunctional cross-linking agent such as a non-polymeric esterified polyol, preferably completely esterified with a carboxylic acid.

Advantageously, the cross-linking agent may be the esterification product of a diol, triol or other polyol containing at least two esterifiable hydroxy groups, e.g. a lower alkyl polyol such as trimethylol propane, pentaerythritol, trihydroxy decane, trihydroxyoctane, inositol, etc. and an unsaturated carboxylic acid, preferably a lower unsaturated monocarboxylic acid such as the acrylic acids, including substituted acrylic acids, e.g. methacrylic, ethacrylic, chloroacrylic, etc. acids. The usable esters, therefore, include, but are not limited to, the esters of the lower polymethylol alkanes having at least three methylol groups and acrylic or lower alkyl substituted acrylic acids. Other non-polyesterified polyol esters can be selected from esters of the acids and alcohols given below as useful in forming polyesters. For example, any of the monocarboxylic acids can be used, as can the dicarboxylic and other polycarboxylic acids. The esterification reaction can be controlled, as is known in the art, to provide a monomeric or non-polyesterified ester, i.e. an ester which does not include an ester-linked repetition of both the acid and polyol groups due to polyesterification. The esters should have at least two, and preferably at least three, polymerizeable ethylene groups. Such esters or the polyols and acids from which they can be prepared are readily available.

Thermosetting polyester resin mixes which can be used in accordance with the present invention are well known and will be recognized by those in the art. Some such resin mixes have already been used in materials to be subjected to high impact conditions and with respect to these mixes the present invention is important in its ability to improve or strengthen a variety of characteristics of such resin mixes for rendering them even more suitable for their intended use. As an example of such resin mix, the mix may include an unsaturated polyester or polyester prepolymer in solution, e.g. in a polymerizable ethylenically unsaturated solvent such as styrene. Usually the polyester in the resin mix is the polycondensation product of an ethylenically unsaturated polycarboxylic acid with a saturated polyhydroxy alcohol or the polycondensation product of an ethylenically unsaturated polyhydroxy alcohol with a saturated polycarboxylic acid.

Suitable unsaturated polyesters comprise reaction products produced by heating at least one dihydric alcohol with at least one dicarboxylic acid, or ester-forming derivative thereof. Dihydric alcohols which may be used comprise ethylene glycol, propylene glycol, the butylene glycols, diethylene glycol, triethylene glycol, the polyethylene glycols, and unsaturated glycols such as, for example vinylethylene glycol. Dicarboxylic acid materials which may be used include maleic anhydride, maleic acid, fumaric acid, citraconic anhydride, citraconic acid and itaconic acid. Although the unsaturated acid may constitute the sole acidic reactant, it is preferred to include other dicarboxylic acid materials such as phthalic acid, phthalic anhydride, and tetrachlorophthalic anhydride, as well as the straight chain aliphatic dicarboxylic acids such as succinic, adipic, azelaic and sebacic acids. The polycarboxylic acids or dicarboxylic acids are also intended to include the anhydrides, esters and acid halides thereof, all of which are ester forming. While a bi-bifunctional resin is preferred for most purposes, reactants of higher functionality such as glycerol and citric acid may be used.

It is within the scope of the present invention to use monohydric alcohols and/or monocarboxylic acids as modifiers in the preparation of the unsaturated polyesters. Unsaturated monofunctional reactants such as allyl and crotyl alcohols and acrylic and crotonic acids may be used. The unsaturated polyesters may be of the oil-modified type.

A specific example of a suitable thermosetting polyester resin mix, referred to hereinbelow as "mix preparation," includes 5 pounds and 15 ounces rigid resin, 8 pounds and 1 ounce flexible resin, 19 grams 2% cobalt naphthenate and 19 grams 60% methylethylketone peroxide in dimethyl phthalate. An exemplary specific rigid resin includes the following listed ingredients:

| | Mol percent |
|---|---|
| Phthalic anhydride | 24.15 |
| Maleic anhydride | 24.15 |
| Propylene glycol | 36.18 |
| Diethylene glycol | 15.50 | dissolved in sufficient styrene to provide a mol percent ratio of styrene: listed ingredients of 63:37 and containing 0.05% para t-butyl catechol based on styrene. An exemplary specific flexible resin includes the following ingredients:

| | Mol percent |
|---|---|
| Adipic acid | 32.11 |
| Maleic anhydride | 16.90 |
| Diethylene glycol | 50.98 | dissolved in sufficient styrene to provide a mol percent ratio of styrene: listed ingredients of 63:37 and containing 0.05% para t-butyl catechol based on styrene.

In the examples given hereinbelow, the resin mix used included 40 parts by weight of the above specific rigid resin and 60 parts by weight of the above specific flexible resin with 2% cobalt naphthenate and 2% of a solution of 60% methylethylketone peroxide in dimethyl phthalate.

Of course, other polyester thermosetting resins may be used if desired. Also, resin mixes which produce polyesters lacking in one or more of the advantageous properties can have such properties imparted thereto or improved therein by the addition of the polyol ester in an amount sufficient to impart or enhance the desired property or properties.

The polyol ester cross-linking agent can be added to the resin mix in any amount sufficient to improve the properties desired to be improved. Advantageously, the amount may be sufficient to improve the surface hardness, tensile strength, elongation properties and/or bounce properties of the cured polyester. Preferably, the amount is sufficient to improve at least the impact strength of the polyester resin. For example, the polyol ester cross-linking agent may be used in minor amounts based on the resin mix, e.g. from about 2.5% or less to about 10% or more, and preferably from about 5 to about 7 weight percent.

In order to more specifically exemplify the present invention, a set of four bowling balls was prepared, each ball including a sawdust resin bonded core of the same size using the same total amount of cover material. In each, the mix preperation specifically identified above was used. In the bowling ball identified as "control," only the mix preperation was used, including none of the polyol ester cross-linking agent. In the balls identified as Examples 1, 2 and 3, respectively, 2%, 5% and 6.7% by weight of the polyfunctional monomer, trimethylolpropane trimethacrylate, was added to and intimately mixed with the resin mix prior to molding and curing of the cover. Curing in each instance was at 210° F. The control ball and the balls of Examples 1, 2 and 3, or samples of their cover materials, were each subjected to a series of tests designed to reveal their suitability for use as bowling balls. A commercial plastic ball also was subjected to the same tests for comparison or reference purposes. The results are reported in the following table:

| Trimethylol propane trimethacrylate percent by weight | Mix Preparation | | | | |
|---|---|---|---|---|---|
| | Control, 0% | Example 1, 2% | Example 2, 5% | Example 3, 6.7% | Com. Plastic Ball, 0% |
| Hardness R_L | 48–55 | 62–88 | 75–78 | 76–84 | 68–71 |
| 60" Bounces | 1,150 | 1,350 | 2,100 | 4,000+ | 450 |
| 18" Bridge | 50 | 50 | 43 | 50 | [1] 50 |
| 27" Bridge | 4 | 7 | | 47 | |
| Rebound, inches | 36 | 39 | 40 | 41 | 36 |
| Tensile Strength, p.s.i. | 3,583 | 3,823 | 4,409 | 4,549 | 3,174 |
| Ult. Elongation, percent | 21.0 | 14.6 | 15.8 | 13.2 | 22.8 |
| Taber Abrasion, mg | 80.9 | 88.5 | 75.0 | 77.8 | 90.2 |
| Taber Scratch, gms | 938 | 836 | 955.5 | 929 | 834 |

[1] The 18" and 27" bridge tests were not actually conducted on this ball and the 50 impacts reported are standard for the ball, with no subsequent 27" bridge test.

In the tests reported in the above table, the hardness $R_L$ was obtained on Rockwell tester, L scale, with a 60 kilogram load and a ¼" penetrator. The 60" bounces test is a test of impact strength and reports the number of drops of 60" onto a smooth 350 pound steel block before failure in the ball cover.

The 18" bridge test is also an impact test in which a 9 pound, 4 ounce hammer was dropped 18" onto a ⅜" bridge between finger holes in the balls, the value reported being the number of such impacts prior to failure at the bridge. The 18″ bridge test was discontinued after fifty such drops and the balls were then subjected to the 27″ bridge test, assuming they had not failed the 18″ bridge test. In the 27″ bridge test, the same procedure was conducted as in the 18″ bridge test except that the hammer was dropped 27″ and the number of such impacts prior to failure, in addition to the impacts reported in the 18″ test, are reported. The rebound values report the average distance that the ball bounced from the steel block in the 60″ bounce test.

The Taber abrasion test was conducted by driving a flat disc sample of the cover material, molded under the same conditions as the corresponding bowling ball cover, on a vertical axis against sliding rotation between two abrading wheels mounted opposite to each other. The wheels tend to abrade in a circular track on the disc. The abrasion results reported are weight of abrasion per given unit of travel measured by loss in weight for a given number of revolutions. In the table, the weights reported are the amount of stock abraded from the tested materials at 1,000 cycles with a 500 gram load on the abrading wheels.

The Taber scratch test is a measure of shear hardness, a quality of a plastic surface to resist digs, scrapes and similar physical damage not classified as normal wear. The Taber scratch test is conducted on the Taber abrasion machine using an attachment which consists of a graduated scale beam with sliding weights to provide adjustable load from 0 to 500 grams. In the test conducted, an additional 500 grams was added to give a scale of 500 to 1,000 grams. A cutting tool, provided with a tungsten carbide edge precision ground to a 25 millimeter radius, is mounted on the underside of the scale beam in line with the axis of a specimen or sample held on a rotatable surface. The sample of material is driven about its axis as in the abrasion test and the weight on the beam is increased until the tool cuts a shallow circular groove. The weights reported in the table are the loads for each sample required to scratch the test piece.

In a further example, the preparation of Examples 1, 2 and 3 was repeated using 7½% of the trimethylolpropane trimethacrylate with excellent results.

It will be apparent from the foregoing that polyester bowling balls and other polyester articles or castings can be prepared having improved properties such as hardness, impact resistance, rebound ability, tensile strength, and ultimate elongation without materially adversely affecting the abrasion and scratch resistance properties.

We claim:

1. A bowling ball having improved surface abrasion-resistant properties and improved rebound properties which comprises a solid spherical core of sawdust bonded with an adhesive resin and a thick thermoset molded polyester resin cover surrounding said core, the polyester resin of said cover comprising a blend of 40 parts by weight rigid polyester resin which is a polyester of 24.15 mol percent of phthalic anhydride, 24.15 mol percent maleic anhydride, 36.18 mol percent propylene glycol and 15.5 mol percent diethylene glycol and 60 parts by weight flexible polyester resin which is a polyester of 32.11 mol percent adipic acid, 16.9 mol percent maleic anhydride and 50.98 mol percent diethylene glycol with 35 mol percent of the total polyester dissolved in 63 mol percent solvent monomer and said resin containing 2% to 10% trimethylolpropane trimethacrylate based on total resin components.

2. A bowling ball having improved surface abrasion-resistant properties and improved rebound properties which comprises a solid spherical core and a thick thermoset molded polyester resin cover surrounding said core, the polyester resin of said cover comprising a blend of rigid and flexible polyesters of diols and unsaturated dicarboxylic acids dissolved in monomer solvent with its properties characterized by a thermoset resin comprising a blend of 40 parts by weight rigid polyester resin which is a polyester of 24.15 mol percent phthalic anhydride, 24.15 mol percent maleic anhydride, 36.18 mol percent propylene glycol and 15.5 mol percent diethylene glycol and 60 parts by weight flexible polyester resin which is a polyester of 32.11 mol percent adipic acid, 16.9 mol percent maleic anhydride and 50.98 mol percent diethylene glycol with 35 mol percent of the total polyester dissolved in 63 mol percent styrene as the solvent monomer, said thermoset resin cross-linked by 2% to 10% trimethylolpropane trimethacrylate based on total resin components.

References Cited

UNITED STATES PATENTS

| | | | |
|---|---|---|---|
| 3,077,424 | 2/1963 | Maker et al. | 117—148 |
| 3,222,421 | 12/1965 | Lundberg | 260—872 |
| 3,256,018 | 6/1966 | Baggenstoss | 260—861 |
| 3,265,763 | 8/1966 | Deichert | 260—872 |
| 3,068,007 | 12/1962 | Satchell | 273—63 |

OTHER REFERENCES

Schildknecht, Vinyl and Related Polymers, John Wiley & Sons Inc., N.Y. (1959), TP986, V–48, S–3, pp. 208, 209, class 260–860.

SIAS, Abrasion and Wear Resistance of Reinforced Polyester Surfaces, Plastics Technology, March 1961, pp. 39–48 and 56.

MURRAY TILLMAN, *Primary Examiner*

J. T. GOOLKASIAN, *Assistant Examiner.*